(12) United States Patent
Rudebeck (10) Patent No.: US 8,448,686 B2
(45) Date of Patent: May 28, 2013

(54) TIRE BEAD SETTING APPARATUS AND RELATED METHODS

(76) Inventor: Gerald A. Rudebeck, Florissant, MO (US)

( * ) Notice: Subject to any disclaimer, the term of this patent is extended or adjusted under 35 U.S.C. 154(b) by 194 days.

(21) Appl. No.: 13/081,586

(22) Filed: Apr. 7, 2011

(65) Prior Publication Data

US 2012/0255681 A1 Oct. 11, 2012

(51) Int. Cl.
*B60C 25/05* (2006.01)
*B60C 25/132* (2006.01)

(52) U.S. Cl.
CPC ................................... *B60C 25/05* (2013.01)
USPC .............................................. 157/1.17; 157/1.1

(58) Field of Classification Search
CPC ............................................... B60C 25/0503
USPC ................................ 157/1.1, 1.17, 5, 1.2, 1.26
See application file for complete search history.

(56) References Cited

U.S. PATENT DOCUMENTS

| | | | |
|---|---|---|---|
| 2,537,189 A * | 1/1951 | King | 157/1.17 |
| 2,918,115 A * | 12/1959 | Twiford | 157/1.1 |
| 2,936,827 A * | 5/1960 | Riggs | 157/1.1 |
| 3,528,474 A * | 9/1970 | May | 157/1.1 |
| 3,774,664 A * | 11/1973 | Matysak | 157/1.1 |
| 3,851,695 A * | 12/1974 | Kimberly | 157/1.1 |
| 3,978,903 A | 9/1976 | Mueller et al. | |
| 4,183,392 A | 1/1980 | Kane | |
| 4,263,958 A | 4/1981 | Corless | |
| 4,451,963 A | 6/1984 | Karr et al. | |
| 4,621,671 A | 11/1986 | Kane et al. | |
| 4,699,185 A | 10/1987 | Cargould et al. | |
| 4,735,250 A | 4/1988 | Kane | |
| 4,744,402 A | 5/1988 | St-Hilaire | |
| 4,947,919 A | 8/1990 | Timlin | |
| 5,022,451 A | 6/1991 | Fenderson | |
| 5,042,547 A | 8/1991 | Van De Sype | |
| 5,172,741 A | 12/1992 | Blomgren, Jr. | |
| 5,456,302 A | 10/1995 | Demers | |
| 5,509,456 A | 4/1996 | Bonko et al. | |
| 5,570,733 A | 11/1996 | Desparois et al. | |
| 5,878,801 A | 3/1999 | Ellis | |
| 5,884,659 A | 3/1999 | Prosser et al. | |
| 6,148,892 A | 11/2000 | Koerner et al. | |
| 6,286,578 B1 * | 9/2001 | Schmitt | 157/1 |
| 6,761,061 B2 | 7/2004 | Corghi | |
| 7,188,518 B2 | 3/2007 | Gonzaga | |
| 2005/0252612 A1 | 11/2005 | Brahler, II | |
| 2007/0074823 A1 * | 4/2007 | Reece et al. | 157/1 |
| 2009/0084506 A1 * | 4/2009 | Lawson et al. | 157/1.1 |
| 2009/0145518 A1 * | 6/2009 | Hoenke | 141/371 |

\* cited by examiner

*Primary Examiner* — David B Thomas
(74) *Attorney, Agent, or Firm* — Harness, Dickey & Pierce, P.L.C.

(57) ABSTRACT

A tire seating apparatus has an air chamber with a sealing edge. A compression device is capable of reciprocating through the air chamber, a wheel, and a tire to seat the tire on the wheel. The air chamber receives the wheel's distal flange and the sealing edge receives the tire's distal surface. The compression device is operable to resiliently compress the wheel's proximal flange against the tire and seat the tire's proximal bead in the proximal flange and to compress the tire against the sealing edge to seal the air chamber. The compression device controls wheel and tire movement away from the air chamber as the air chamber and tire are filled with compressed air through the wheel to seat the tire's distal bead in the wheel's distal flange.

20 Claims, 5 Drawing Sheets

TIRE BEAD SETTING APPARATUS AND RELATED METHODS

FIELD

The present disclosure relates to apparatus and methods for setting beads of a tire onto a wheel.

BACKGROUND

This section provides background information related to the present disclosure which is not necessarily prior art.

Automobiles, trucks, bicycles, golf carts, mowers, etc. are typically driven on tubeless tires. When a tubeless tire is installed or replaced on a wheel, beads of the tire typically need to be appropriately seated onto the rims of the wheel so that the tire holds air when the tire is inflated.

SUMMARY

This section provides a general summary of the disclosure, and is not a comprehensive disclosure of its full scope or all of its features.

The present disclosure, in one aspect, is directed to a tire seating apparatus. An air chamber has a sidewall terminating in a cylindrical sealing edge. An elongate compression device is configured to receive and reciprocate through the air chamber, a wheel, and a tire to seat the tire on the wheel. The air chamber is configured to receive a distal flange of the wheel in the air chamber and to receive a distal surface of the tire on the sealing edge. The compression device is operable to resiliently compress a proximal flange of the wheel against the tire and seat a proximal bead of the tire in the proximal flange and to resiliently compress the distal surface of the tire against the air chamber sealing edge to substantially seal the air chamber. The compression device is further configured to resiliently control movement of the wheel and tire away from the air chamber as the air chamber and tire are filled with compressed air through the wheel to seat a distal bead of the tire in the distal flange of the wheel.

In another implementation, the disclosure is directed to a method of seating a tire on a wheel. The tire and wheel are placed onto a proximal portion of an elongate compression device of a tire seating apparatus. The compression device extends through an air chamber of the apparatus. The placing is performed to position a distal side of the tire onto a proximal sealing edge of the air chamber and to allow a distal flange of the wheel in the tire to be received in the air chamber. The compression device is operated to resiliently press the wheel against the tire, to compress the tire against the air chamber, and to seat a proximal bead of the tire in a proximal flange of the wheel. The method includes filling the air chamber and compressed tire with compressed air. The filling is performed to seat the distal bead of the tire in the distal flange of the wheel as the wheel is moved resiliently on the compression device.

In another implementation, the disclosure is directed to a tire seating apparatus. A compression rod is movable relative to a housing. The compression rod and housing are configured to receive an air chamber having a sidewall terminating in a cylindrical proximal sealing edge. The compression rod has a proximal portion configured to extend through and beyond the received air chamber. The housing is configured to support the air chamber when a wheel and tire are positioned onto the compression rod to allow a distal flange of the wheel to enter the air chamber and to position a distal surface of the tire on the air chamber sealing edge. A lockdown assembly is adjustably attachable to and movable with the compression rod toward the air chamber to resiliently compress a proximal flange of the wheel against the tire and seat a proximal bead of the tire in the proximal flange, and to resiliently compress a distal surface of the tire against the air chamber sealing edge to substantially seal the air chamber. The lockdown assembly is further configured to resiliently control movement of the wheel and tire on the compression rod away from the air chamber as the air chamber and tire are filled with compressed air through a valve in the wheel to seat a distal bead of the tire in the distal flange of the wheel.

In yet another implementation, the disclosure is directed to a seal plate assembly. The assembly includes a substantially solid seal plate configured to cover a side of a wheel while leaving exposed a wheel flange encircling the side. An air valve is accessible on an outer side of the seal plate. An air conduit extends from the air valve through the seal plate and is configured to extend into the wheel when the seal plate assembly covers the side of the wheel. The seal plate has a central opening configured to allow the seal plate to be positioned onto a compression device of a tire seating apparatus.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals may indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. It should be further understood that the terms "proximal" and "distal" are used in this disclosure and the claims with reference to a user of an apparatus.

In various aspects, the present disclosure is directed to apparatus and methods for seating a tire onto a wheel and for inflating the tire. Various tire seating and tire inflating configurations may be provided that are portable. Other configurations, however, may be semi-portable or may be provided as fixtures. One configuration of a tire seating apparatus is indicated generally in FIGS. 1 and 2 by reference number 20. The apparatus 20 is manually operable by a user (not shown) who stands next to the apparatus.

The terms "upper" and/or "proximal" may be used in this disclosure and the claims to refer to an "outer" side of a wheel and/or tire as installed on an axle. The terms "lower" and/or "distal" may be used in this disclosure and the claims to refer to "inner" sides of a wheel and/or tire as installed on an axle. For example, the side of a wheel on which a fill valve is provided and/or accessible by a user may be referred to as the "proximal side" and/or "upper side." As explained below, the side of a wheel on which a fill valve is provided would typically be positioned facing upward, e.g., on the apparatus 20.

The apparatus 20 includes a support structure, e.g., a metal frame 22, that supports a housing 24. The housing 24 has a floor 26, a sidewall 28 (shown in phantom in FIG. 1) a cover or top 30, and an inner recess 32. The cover 30 has an opening 34. A compression rod 36 is capable of reciprocating relative to the frame 22 and housing 24 through an opening 38 in a center strut 40 of the frame 22 and through a hole 42 in the housing floor. The compression rod 36 and housing 24 may be made, e.g., of metal.

Figure 1:
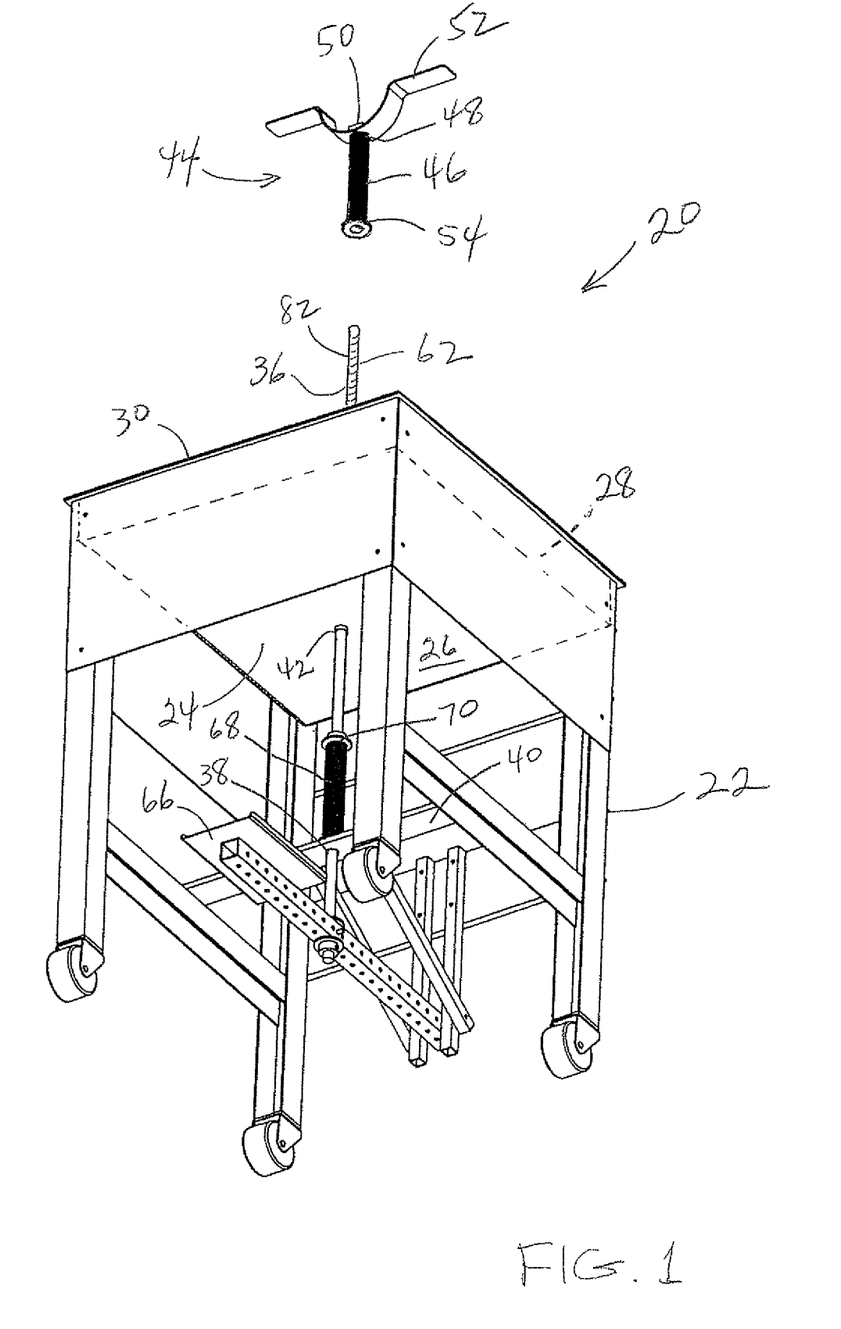
FIG. 1 is a partially exploded lower perspective view of an apparatus for seating a tire in accordance with one implementation of the disclosure.

A lockdown assembly 44 is operative together with the rod 36 to provide a compression device. The assembly 44 includes a proximal resilient member, e.g., a coil spring 46 having a proximal end 48 terminating in a nut 50. A handle 52 is provided to facilitate attachment, adjustment, use and/or removal of the lockdown assembly relative to the compression rod 36. The spring proximal end 48 is configured for movement in unison with the compression rod 36 when the lockdown assembly is attached to the compression rod 36. As further described below, a distal end 54 of the spring is configured to be compressed against a wheel when the compression rod 36 is moved distally.

Figure 2:
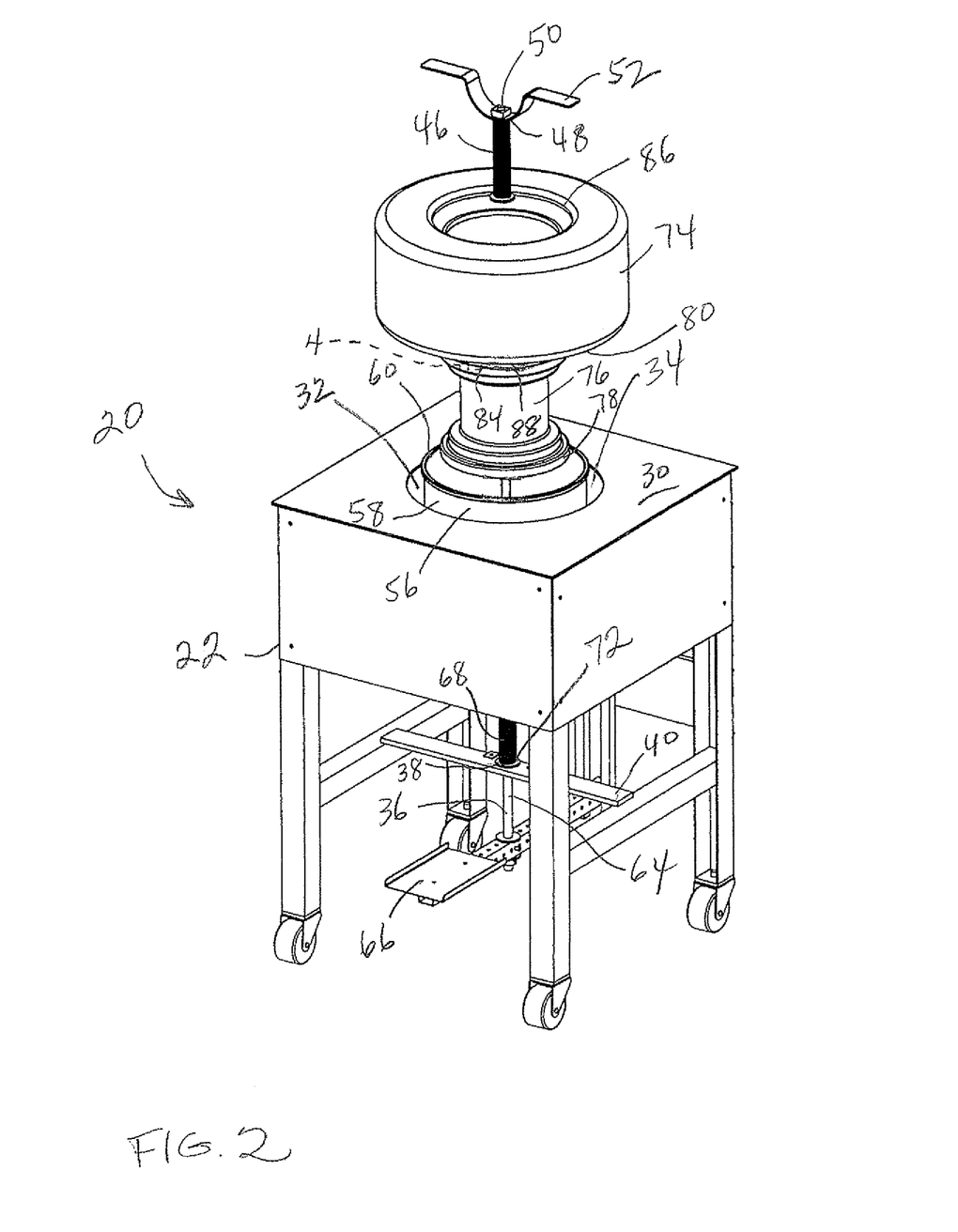
FIG. 2 is a partially exploded upper perspective view of an apparatus for seating a tire in accordance with one implementation of the disclosure, shown with a tire and wheel.
Figures 3A, 3B, 3C, 3D, 3E:
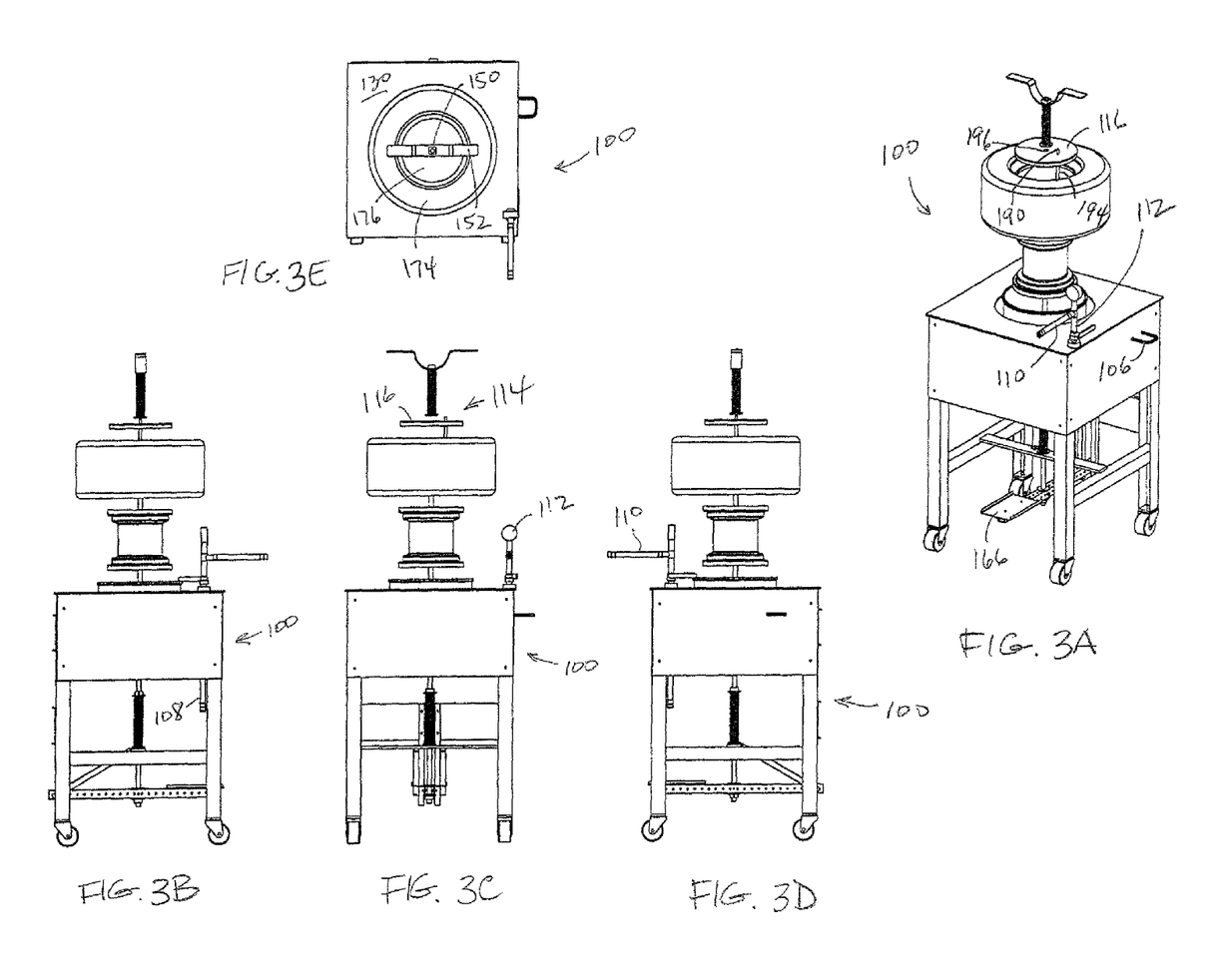
FIG. 3A is a partially exploded upper perspective view of an apparatus for seating a tire in accordance with one implementation of the disclosure.
FIG. 3B is a partially exploded side view of an apparatus for seating a tire in accordance with one implementation of the disclosure.
FIG. 3C is a partially exploded frontal view of an apparatus for seating a tire in accordance with one implementation of the disclosure.
FIG. 3D is a partially exploded side view of an apparatus for seating a tire in accordance with one implementation of the disclosure.
FIG. 3E is a top view of an apparatus for seating a tire in accordance with one implementation of the disclosure.

The compression rod 36 and housing 24 are configured to receive an air chamber 56 as shown in FIG. 2. A bottom (not shown) of the air chamber has an opening through which the compression rod 36 receives the air chamber 56 and is capable of reciprocating. Generally, a compression device may be described in the disclosure and claims as "receiving" or "configured to receive" an element such as an air chamber, tire, and/or wheel, where the element is placed onto and possibly moved along the compression device. It should be noted that configurations also are possible in which a compression device is placed into and/or through an element. In such a configuration the element may be described as "receiving" or "configured to receive" the compression device.

The air chamber 56 has a sidewall 58 terminating in a cylindrical proximal sealing edge 60. The sealing edge 60 may be fabricated from various materials, including but not limited to rubber, plastic, foam, memory foam, etc. Virtually any material may be used that would allow a tire to be pressed against the sealing edge so as to make the air chamber 56 substantially airtight when the apparatus 20 is in use as further described below.

A proximal portion 62 of the compression rod 36 extends through and beyond the air chamber 56 when the air chamber 56 is positioned in the housing 24. It should be noted that the housing 24 is capable of receiving and supporting air chambers having various sizes and dimensions. Thus the apparatus 20 can be used in relation to various wheel and tire sizes.

A distal portion 64 of the compression rod 36 is operatively connected with an actuator, e.g., a foot pedal 66. Other or additional actuators could be used in various configurations. For example, manually controlled, knee-controlled and/or other mechanically controlled actuators could be used. Additionally or alternatively, variably controllable electrical and/or electronic actuators, e.g., solenoid actuators, could be used to control movement of the compression rod 36 in some configurations. In still other configurations, no actuator would be provided.

A distal resilient member, e.g., a coil spring 68, is attached to the compression rod 36 distally of the housing 24. The spring 68 has a proximal end 70 mounted for movement in unison with the compression rod 36 and a distal end 72 affixed, e.g., to the center strut 40 of the support structure 22. A user may depress the foot pedal 66 to move the compression rod 36 distally (in the present example, downwardly), thereby compressing the distal spring 68. The foot pedal may be released from a depressed position to allow the compression rod to be pushed proximally (in the present example, upwardly) by release of the spring 68. It should be noted generally that other resilient and/or biasing devices could be used in various configuration in addition to or in place of coil springs.

Referring now to FIG. 2, to prepare for seating a tire 74 on a wheel 76, a user places the wheel 76 and tire 74 onto the compression rod 36. A distal flange 78 of the wheel 76 is allowed to enter the air chamber 56 and a distal surface 80 of the tire 74 is positioned on the air chamber sealing edge 60. The rest of the tire may be at least partially supported by or on the top 30 of the housing 24.

In the configuration shown in FIGS. 1 and 2, the lockdown assembly 44 is adjustably attachable to, and movable with, the compression rod 36. To position the lockdown assembly 44, a user places the distal end 54 of the spring 46 over the proximal end of the compression rod 36 and threads the nut 50 onto threads 82 on the compression rod 36 proximal end to a desired location on the compression rod 36.

The lockdown assembly 44 is movable with the compression rod 36 toward the wheel 76 and tire 74 to resiliently compress a proximal flange 84 of the wheel 76 against the tire 74 and thereby seat a proximal bead 86 of the tire in the proximal flange 84. Moving the compression rod 36 distally also causes the lockdown assembly 44 to resiliently compress the distal surface 80 of the tire 74 against the air chamber sealing edge 60, e.g., to make the air chamber 56 and wheel 76 substantially airtight so that the user may fill the air chamber 56 and tire 74 with compressed air.

As the air chamber 56, wheel 76, and tire 74 are filled with compressed air through a valve 4 (shown in phantom) in the wheel 76, the lockdown assembly 44 may serve to resiliently restrain movement of the wheel 76 and tire 74 on the compression rod 36. In various implementations of the disclosure, the filling of the air chamber 56, wheel 76, and tire 74 with compressed air causes a distal bead (not shown) of the tire 74 to become seated in the distal flange 78 of the wheel 76.

An exemplary method of seating a tire on a wheel using the apparatus 20 shall now be described with reference to FIGS. 1 and 2. A user places an appropriately sized air chamber 56 into the housing 24. The user may insert bolts into bolt holes (not shown) of the wheel 76 to prevent loss of air pressure in the air chamber 56, tire 74, and wheel 76 through the bolt holes during inflation of the tire. To increase air flow rate and pressure during inflation of the tire 74 through the conventional air valve 4 provided in the wheel 76, the user may also remove a valve core from a stem of the valve. Additionally or alternatively, the user may position a seal plate assembly onto the wheel 76 as further described below.

The user places the tire 74 and wheel 76 onto the compression rod 36 and onto the air chamber 56 so as to position a distal surface of the tire 74 generally over the proximal sealing edge 60 of the air chamber 56 and to allow the distal flange of the wheel to enter the air chamber 56 inside the proximal sealing edge 60. Before attaching the lockdown assembly 44 the user may place, e.g., an appropriately sized washer over the compression rod 36 and onto the wheel 76 to prevent loss of air pressure through the axle hole in the wheel 76 during inflation of the tire 74. The user attaches the lockdown assembly 44 onto the compression rod, e.g., by placing the spring 46 onto the rod and turning the handle 52 to thread the nut 50 onto the rod 36 until the distal end 54 of the spring 46 presses against a proximal surface 88 of the wheel 76.

It should be noted generally that by operating the foot pedal 66, the user can make the compression rod 36 reciprocate through the wheel 76 and tire 74 and can produce a springing action in the compression rod 36. The springs 46 and 68 are compressed as the compression rod 36 is moved distally and are at least partially released as the rod 36 is moved proximally. After attaching the lockdown assembly 44, the user may depress the foot pedal 66 to move the compression rod 36 distally by an amount appropriate to cause the lockdown assembly 44 to compress the wheel 76 against the tire 74 and the tire against the sealing edge 60 of the air chamber 56. The distal movement of the compression rod 36 causes the proximal bead 86 of the tire to be seated in the proximal flange 84 of the wheel. When the tire 74 is compressed against the air chamber sealing edge 60, the air chamber 56, wheel 76 and tire 74 can be made substantially airtight.

To set the distal bead of the tire 74, the user fills the air chamber 56 and the tire 74 with compressed air. Specifically, and for example, the user attaches an air hose (not shown) to the valve 4 stem on the wheel 76. Compressed air enters the wheel 76, air chamber 56 and tire 74. Rising air pressure in the air chamber 56 and tire 74 cause the wheel 76 to move proximally, the tire 74 to inflate, and the distal flange of the wheel 76 to move into engagement with the distal bead of the tire 74. As the tire 74 becomes inflated, the wheel 76 tends to push proximally against the lockdown assembly 44. The user may hold the tire 74 in place on the housing 24 and may release the foot pedal 66 when the tire 74 is substantially inflated. The user removes the air hose and lockdown assembly 44 from the tire, replaces the valve core in the wheel valve 4 and may "top off" the air in the tire. The seated and inflated tire 74 may then be removed from the compression rod 36.

Another configuration of a tire seating apparatus is indicated generally in FIGS. 3A-3E and 4 by reference number 100. The apparatus 100 includes a support structure 122 that supports a housing 124 having a floor 126, a sidewall 128, a cover 130, and an inner recess 132. A rubber mat 104 may also be provided to provide a non-slip surface on the cover 130. The cover 130 has an opening 134. A compression rod 136 is capable of reciprocating relative to the frame 122 and housing 124 through an opening 138 in a center strut 140 of the frame 122 and through a hole (not shown in FIGS. 3A-3E and 4) in the housing floor 126.

A lockdown assembly 144 includes a proximal resilient member, e.g., a coil spring 146 having a proximal end 148 terminating in a nut 150. A handle 152 is provided to facilitate attachment, adjustment, use and/or removal of the lockdown assembly 144 relative to the compression rod 136. The spring proximal end 148 is configured for movement in unison with the compression rod 136 when the lockdown assembly 144 is attached to the compression rod 136.

The compression rod 136 and housing 124 are configured to receive an air chamber 156. A bottom (not shown) of the air chamber 156 has an opening through which the compression rod 136 receives the air chamber 156 and is capable of reciprocating. The air chamber 156 has a sidewall 158 terminating in a cylindrical proximal sealing edge 160. A proximal portion 162 of the compression rod 136 extends through and beyond the air chamber 156 when the air chamber 156 is positioned in the housing 124.

A distal portion 164 of the compression rod is operatively connected with an actuator, e.g., a foot pedal 166. A distal resilient member, e.g., a coil spring 168, is attached to the compression rod 136 distally of the housing 124. A bracket 106 is provided for holding the lockdown assembly 144 when not in use and/or for holding an air hose.

The apparatus 100 includes an air inlet 108 accessible, e.g., beneath the housing 124 for connection of an air compressor (not shown) thereto. A connector 110 and air gauge/valve shutoff 112 are accessible, e.g., on top of the housing 124. An air hose (not shown) may be connected with the connector 110 and gauge/valve shutoff 112 and may be used to fill the air chamber 156, a wheel 176, and a tire 174 when the wheel 176 and tire 174 have been appropriately positioned for sealing and filling, e.g., as previously discussed with reference to FIGS. 1 and 2.

Figure 4:
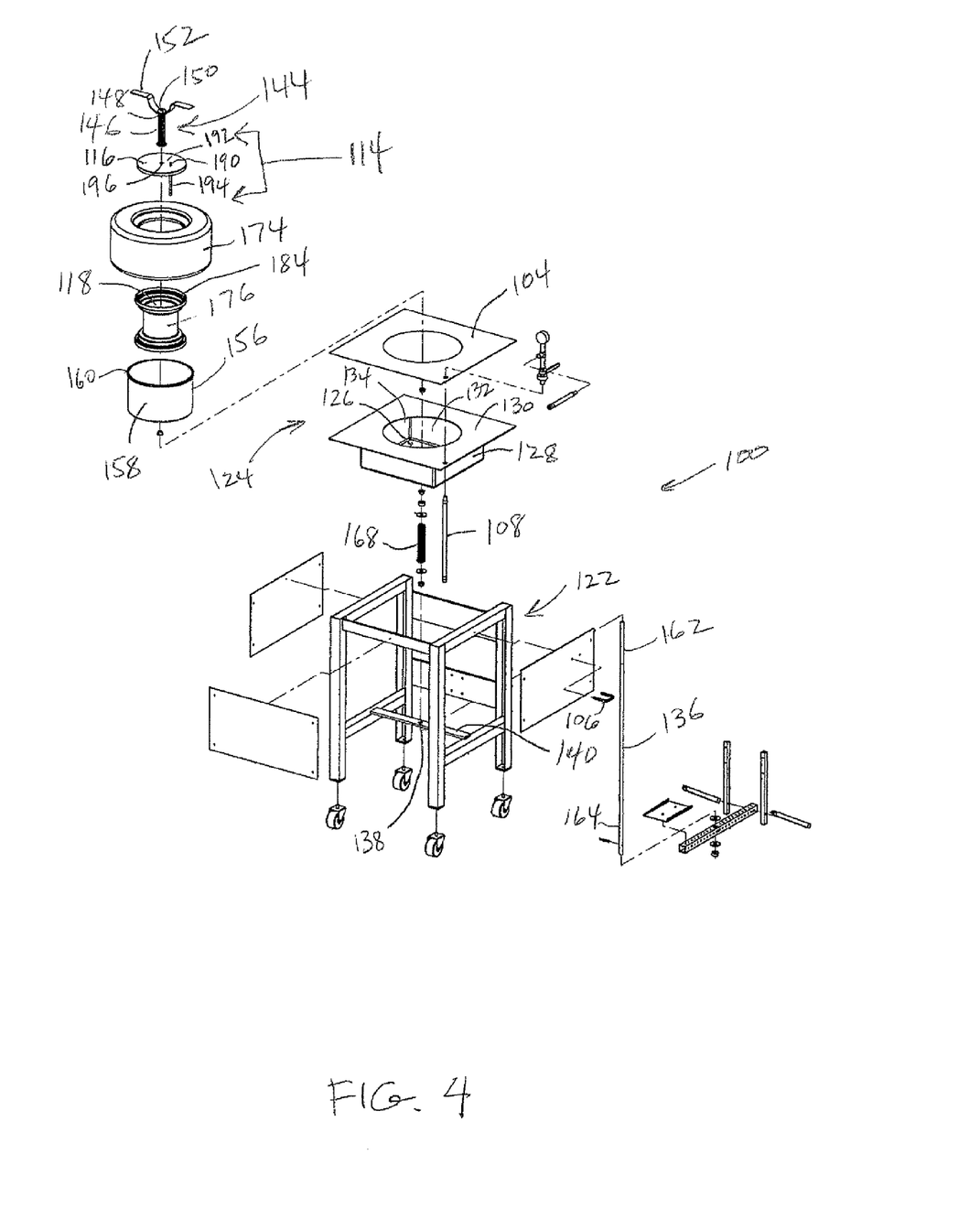
FIG. 4 is an exploded perspective view of an apparatus for seating a tire in accordance with one implementation of the disclosure.

As a general matter, many wheels have spokes, wires, decorative perforations, etc. that allow the passage of air through the wheel. In various implementations of the disclosure, a seal plate assembly may be provided for use in seating a tire on such a wheel. One configuration of a seal plate assembly is indicated generally by reference number 114. The assembly 114 includes a substantially solid seal plate 116. The seal plate 116 is configured to cover a side 118 of the wheel 176 while leaving exposed a proximal flange 184 of the wheel. The assembly 114 also includes an air valve 190 accessible on a proximal (e.g., outer) side 192 of the plate. An air conduit 194 extends from the air valve 190 through the seal plate 116 and is configured to extend into the wheel 176 when the seal plate assembly covers the side of the wheel 176. The seal plate 116 has a central opening 196 configured to allow the seal plate assembly 114 to be positioned onto a compression device of a tire seating apparatus, e.g., the compression rod 136 of the apparatus 100.

When the seal plate assembly 114 is installed on the wheel 176, a conventional air valve provided on the wheel can be covered by the seal plate. The user can use the seal plate air valve 190 instead of the conventional valve to fill the wheel 176, air chamber 156 and tire 174 and to seat the tire as previously discussed.

In some configurations, a switch may be provided for operating an air compressor as described above. For example, a button switch or other switch mechanism may be provided on or near the foot pedal 166. After connecting an air hose to an air valve on the wheel, the user can operate the switch to turn the compressor on or off without having to use his hands, leaving his hands free to control the tire and wheel.

Figure 5:
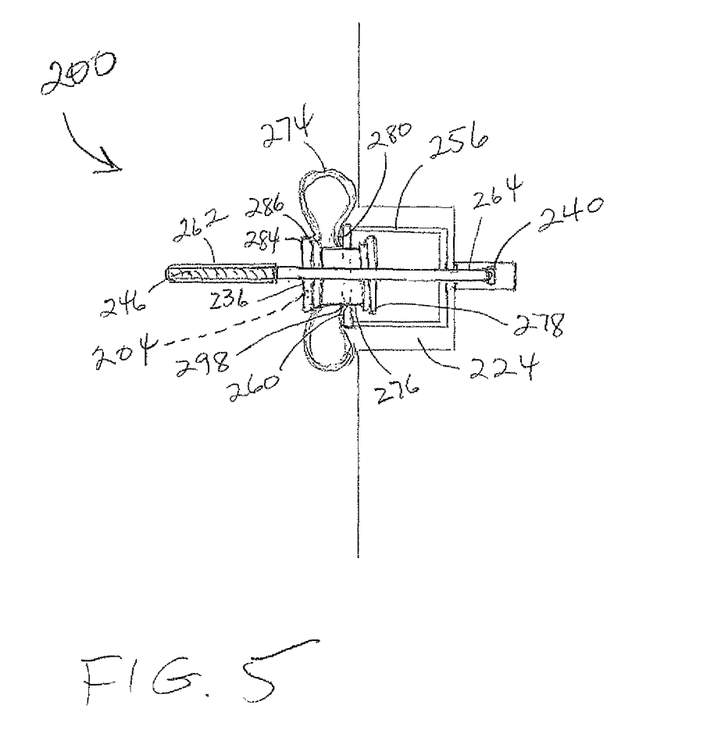
FIG. 5 is a sectional view of an apparatus for seating a tire in accordance with one implementation of the disclosure.

It should be noted that various types and arrangements of compression devices, air chambers, etc. could provide tire seating and filling. Another configuration of a tire seating apparatus is indicated generally in FIG. 5 by reference number 200. The apparatus 200 may be provided as a fixture installed, e.g., in a wall or floor. As shown in FIG. 5, the apparatus 200 includes an air chamber 256 that is removably received in a wall cavity 224. A compression device, e.g., a loading bar 236, is capable of reciprocating relative to the air chamber 256. A proximal portion 262 of the loading bar includes a spring 246. Proximal movement of the bar 236 is limited by a flange 240 on a distal end 264 of the bar 236.

A user may place a tire 274 and wheel 276 onto the proximal portion 262 of the loading bar 236 such that a distal surface 280 of the tire 274 is positioned onto a proximal sealing edge 260 of the air chamber 256. A distal flange 278 of the wheel 276 is allowed to enter the air chamber 256. The user operates the loading bar 236 to resiliently press the wheel 276 against the tire 274, to compress the tire 274 against the air chamber 256, and to seat a proximal bead 286 of the tire in a proximal flange 284 of the wheel 276. The user may then fill the air chamber 256 with compressed air through an air valve 204 (shown in phantom) in the wheel 276 or through a valve provided in a seal plate assembly as previously described. Filling of the tire 274 causes a distal bead 298 of the tire 274 to become seated in the distal flange 278 of the wheel 276 as the wheel is moved resiliently on the loading bar 236.

The foregoing apparatus and methods make it possible to seat a tubeless tire and also to fill it in one quick, easy sequence. The apparatus is well suited for acquisition and use, e.g., by individuals and garages that do not have physical space or business volume to justify purchasing a conventional tire seating system. In contrast to many conventional tire seating systems, many configurations in accordance with the disclosure can be compact, relatively lightweight, and easily moved, e.g., on casters.

Where air chambers of different sizes are provided, the apparatus can accommodate many different vehicle wheel sizes. The use of a seal plate assembly makes it a simple matter to seat and fill tires on wheels (such as wire wheels) that can be problematic in relation to other tire seating systems and methods. In some configurations, air chambers of various sizes could be provided conveniently in a stack, e.g., in the apparatus support structure. A user then could selectively remove one or more air chambers from the stack to reach and use an appropriately sized air chamber. Air chamber(s) that were not removed could remain stacked in the support structure while a tire is being seated and filled. Various configurations can be used in relation to virtually any type of tire bead and wheel.

The use of an air chamber and the temporary removal of a valve core as make it possible to fill a tire rapidly without having to use the higher air pressures provided, e.g., by shop air units. A tire could be seated and filled, e.g., using air pressure at about 60 psi (pounds per square inch). In some configurations, a portable air storage tank could be used to provide a "burst" of air to fill and seat a tire. The storage tank could be filled from a portable air compressor receiving power, e.g., from an automobile instrument panel power outlet.

The foregoing description of the embodiments has been provided for purposes of illustration and description. It is not intended to be exhaustive or to limit the disclosure, individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tire seating apparatus comprising:
   an air chamber having a sidewall terminating in a cylindrical sealing edge; and
   an elongate compression device configured to receive and reciprocate through the air chamber, a wheel, and a tire to seat the tire on the wheel;
   the air chamber configured to receive a distal flange of the wheel in the air chamber and to receive a distal surface of the tire on the sealing edge;
   the compression device operable to resiliently compress a proximal flange of the wheel against the tire and seat a proximal bead of the tire in the proximal flange and to resiliently compress the distal surface of the tire against the air chamber sealing edge to substantially seal the air chamber;
   the compression device further configured to resiliently control movement of the wheel and tire away from the air chamber as the air chamber and tire are filled with compressed air through the wheel to seat a distal bead of the tire in the distal flange of the wheel.

2. The tire seating apparatus of claim 1, the compression device comprising a compression rod and a lockdown assembly.

3. The tire seating apparatus of claim 1, the compression device comprising a loading bar.

4. The tire seating apparatus of claim 1, the air chamber configured to be removably received in a portable housing.

5. The tire seating apparatus of claim 1, the air chamber configured to be removably received in a housing provided in a floor or wall.

6. The tire seating apparatus of claim 1, wherein the air chamber and tire are filled with compressed air through a valve extending through a proximal side of the wheel.

7. The tire seating apparatus of claim 1, further comprising a seal plate assembly including:
   a substantially solid seal plate configured to cover a side of a wheel while leaving exposed a wheel flange encircling the side;
   an air valve accessible on an outer side of the seal plate; and
   an air conduit extending from the air valve through the seal plate and configured to extend into the wheel when the seal plate assembly covers the side of the wheel;
   the seal plate having a central opening configured to allow the seal plate to be positioned onto a compression device of a tire seating apparatus.

8. A method of seating a tire on a wheel, the method comprising:
   placing the tire and wheel onto a proximal portion of an elongate compression device of a tire seating apparatus, the compression device extending through an air chamber of the apparatus, the placing performed to position a distal side of the tire onto a proximal sealing edge of the air chamber and to allow a distal flange of the wheel in the tire to be received in the air chamber;
   operating the compression device to resiliently press the wheel against the tire, to compress the tire against the air chamber, and to seat a proximal bead of the tire in a proximal flange of the wheel; and
   filling the air chamber and compressed tire with compressed air, the filling performed to seat the distal bead of the tire in the distal flange of the wheel as the wheel is moved resiliently on the compression device.

9. The method of claim 8, further comprising removably placing the air chamber onto the compression device and at least partially into a housing of the apparatus.

10. The method of claim 8, further comprising filling the air chamber and compressed tire with compressed air through an air valve in the wheel.

11. The method of claim 8, wherein the tire is tubeless.

12. The method of claim 8, further comprising:
   using a foot pedal to move the compression device; and
   operating a switch on or near the foot pedal to fill the air chamber and tire with compressed air.

13. The method of claim 8, wherein the air valve is provided on a flange seal plate assembly, and placing the wheel onto the compression device comprises positioning the flange seal plate assembly to substantially seal the wheel at the proximal flange of the wheel.

14. The method of claim 8, wherein moving the compression device comprises positioning a proximal resilient member onto a proximal end portion of a compression rod and moving the rod downward to compress a distal resilient member affixed to a distal portion of the compression rod.

15. A tire seating apparatus comprising:
   a compression rod movable relative to a housing, the compression rod and housing configured to receive an air chamber having a sidewall terminating in a cylindrical proximal sealing edge, the compression rod having a proximal portion configured to extend through and beyond the received air chamber, the housing configured to support the air chamber when a wheel and tire are positioned onto the compression rod to allow a distal flange of the wheel to enter the air chamber and to position a distal surface of the tire on the air chamber sealing edge; and
   a lockdown assembly adjustably attachable to and movable with the compression rod toward the air chamber to resiliently compress a proximal flange of the wheel against the tire and seat a proximal bead of the tire in the proximal flange, and to resiliently compress a distal surface of the tire against the air chamber sealing edge to substantially seal the air chamber;
   the lockdown assembly further configured to resiliently control movement of the wheel and tire on the compression rod away from the air chamber as the air chamber and tire are filled with compressed air through a valve in the wheel to seat a distal bead of the tire in the distal flange of the wheel.

16. The apparatus of claim 15, further comprising a distal resilient member attached to the compression rod distally relative to the housing, the distal resilient member having a proximal end mounted for movement in unison with the compression rod and a distal end affixed to a support structure through which the compression rod extends.

17. The apparatus of claim 15, the lockdown assembly comprising a proximal resilient member having a proximal end configured for movement in unison with the compression rod and a distal end configured to be compressed against the wheel when the compression rod is moved distally.

18. The apparatus of claim 15, further comprising a flange seal plate assembly having a seal plate and an air valve included in and extending through the seal plate, the flange seal plate assembly positionable over the compression rod and onto the wheel to provide the valve in the wheel.

19. The apparatus of claim 15, the housing configured to receive removable air chambers having different sizes.

20. The apparatus of claim 15, further comprising a foot pedal operable to cause the compression rod to reciprocate in the housing.

* * * * *